(12) United States Patent
Choi

(10) Patent No.: US 7,175,501 B2
(45) Date of Patent: Feb. 13, 2007

(54) CHILDREN'S CAR DRIVEN BY SWIVELING OPERATIONS OF A STEERING WHEEL

(75) Inventor: Bong Kyu Choi, Shiheung (KR)

(73) Assignee: Sonokong Co., Ltd. (KR)

( * ) Notice: Subject to any disclaimer, the term of this patent is extended or adjusted under 35 U.S.C. 154(b) by 34 days.

(21) Appl. No.: 11/075,898

(22) Filed: Mar. 9, 2005

(65) Prior Publication Data

US 2005/0248104 A1 Nov. 10, 2005

(30) Foreign Application Priority Data

May 7, 2004 (KR) .................. 20-2004-0012711

(51) Int. Cl.
*A63H 17/36* (2006.01)
(52) U.S. Cl. .................. 446/468; 446/469; 280/249
(58) Field of Classification Search ........ 446/465–469; 280/242.1, 249, 250, 267, 268, 269
See application file for complete search history.

(56) References Cited

U.S. PATENT DOCUMENTS

| 1,326,697 | A | * | 12/1919 | Smith .................. 280/249 |
| 2,600,950 | A | * | 6/1952 | Wyche et al. ............. 280/249 |
| 3,902,739 | A | * | 9/1975 | Kimura .................. 280/249 |
| 4,810,229 | A | * | 3/1989 | Shoji .................. 446/443 |
| 5,791,964 | A | * | 8/1998 | Pohlman .................. 446/103 |
| 6,386,304 | B1 | * | 5/2002 | Wang .................. 180/65.1 |

FOREIGN PATENT DOCUMENTS

JP 1990-149395 12/1990

* cited by examiner

*Primary Examiner*—Kien Nguyen
(74) *Attorney, Agent, or Firm*—King & Schickli, PLLC

(57) ABSTRACT

The present invention relates to a children's car that moves forward with a simple and easy operation with particular care taken of the safety of the child riding the car. A steering block which can be steered with a steering wheel and a steering column is provided at the front of the car body. Drive wheels having a ratchet wheel are provided on opposed sides of the steering block. Auxiliary wheels are provided at the front and the rear of the steering block to stably support the car body. As a child sits on or in the car and turns the steering wheel in alternating directions, the right and left drive wheels rotate in a forward direction. A pawl linked to the steering block engages the ratchet wheels to prevent inverse rotation of the drive wheels, causing the car to proceed ahead in a zig-zag pattern.

12 Claims, 4 Drawing Sheets

CHILDREN'S CAR DRIVEN BY SWIVELING OPERATIONS OF A STEERING WHEEL

TECHNICAL FIELD

The present invention relates to a children's car. More specifically, the invention relates to a children's car which may be propelled in a forward direction by operation of a steering wheel by the user.

BACKGROUND OF THE INVENTION

The present invention relates to a children's car that moves forward by swiveling operations of a steering wheel.

In prior arts, a child moved a car in which he was seated by simply kicking the ground backwards alternatingly with his feet, or by pedaling on a crankshaft linked to both front wheels.

In another conventional version of a children's car, the steering wheel is swiveled repeatedly by a child on the car to cause the car to move forward through successive 'pick and pull' operations of a scraper at the front on a floor or ground.

In prior arts of a scraper's 'pick and pull' operation, however, it poised a problem of a floor being scratched by the scraper when used indoor and of requiring heavy efforts for swiveling handles due to greater frictional force although swiveling procedure was simple for a child.

Besides the above, a children's car that moves forward in a zigzag pattern by a swiveling operation of a steering wheel by a riding child is known. (Japanese Utility Model Application No. 1989-58939, Publication No. 1990-149395).

As noted above, children's cars of various types have been known. The types of children's car that moves forward in a zigzag pattern by the operation of a steering wheel have their merits and are thus fairly popular as a toy. However, none of the children's cars known are free from room for improvement. When the cars are put into use, problems are encountered leaving room for improvement. A child is apt to act unpredictably.

Therefore, despite the fact that the car falls into a category of a toy, it could cause a hazardous situation. For example, children's cars in general are manufactured in light weight. Because of this, if a child stands up from a seat or makes a sudden move forward from the seat, problems can arise. For instance, if the child makes a sudden forceful move forward, the child can slip against the children's car or cause imbalance between the child's body and the children's car, causing the rear portion of the car to be lifted, leading the car to fall forward. As a result, the child could be tossed out of the car and injured depending upon the condition of the floor surface. The types of a children's car that moves forward in a zigzag pattern only by the operation of a steering wheel are liable to such a hazardous situation.

The children's car with a crank shaft could also cause a problem, the crank shaft itself becoming a hazard causing point. The scraper-type can cause problems as aforementioned, causing damage to the floor and causing difficulty in operating the handle when the friction resistance is considerable. Therefore, whatever type the children's car may be with their own specific features, there is essential need for a safe children's car free from hazards.

SUMMARY OF THE INVENTION

The present invention relates to a new type of children's car as an improvement of shortcomings of the existing children's cars, with the following objectives.

An objective of the present invention is to provide a children's car that can move forward by a simple operation.

Another objective of the present invention is to provide a children's car with less likelihood of hazards caused by the car's falling.

To attain the above objectives, the present invention presents the following construction.

In one aspect, the children's car of the first of the present invention comprises: a car body (1); a steering mechanism comprising a steering wheel (7) provided at the front of the car body (1) and fixed to a steering column (6), said steering wheel (7) being swivelable left and right; a pair of ground-engaging drive wheels (2) provided at the bottom of the car body (1) that move forward by rotation over the floor on which the car runs; ratchet wheels (G) provided as an integral part on the sides of said pair of drive wheels (2); a steering block or bar (5) that is provided at the bottom of said steering column (6) and transmits the swiveling operation of the steering wheel (7) to the drive wheels (2); and pawls (P) that are provided on both sides of said steering block (5) and engage with said ratchet wheels (G), making it possible for only one of the drive wheels (2) to rotate only forward by the operation of the steering wheel (7), characterized in that by the swiveling operation of said steering wheel (7), the car body (1) moves forward as said pair of drive wheels (2) rotate forward changing their directions alternately.

In another aspect, the children's car of the present invention further comprises auxiliary wheels (2a) that are rotatably provided at the front and rear of said steering block or bar (5) through shafts (4X) running at right angle with said drive wheels (2) in order to maintain stability of the car body and the safety of the child, said auxiliary wheels (2a) being in contact with the floor when the car is tilted by the actions of the child.

In yet another aspect, the children's car of the present invention is further characterized in that said auxiliary wheels (2a) are provided such that there is a certain gap between them and the floor on which the children's car moves and that said auxiliary wheels (2a) come in contact with the floor when said car body (1) tilts at a certain angle.

In still yet another aspect, the children's car of the present invention is further characterized in that said steering block or bar (5) is in the form of a rectangular parallelepiped defining at least a left side, a right side, a front side, and a rear side.

As explained above, the children's car of the present invention characterizes that by a simple construction of the ratchet wheel and the pawl, only one of the pair of the drive wheels can rotate forward by a turn of the steering wheel. In other words, greater dependability is assured by the employment of simple structure. The children's car can be moved forward in a zigzag pattern with simple operations of turning the steering wheel left and right. Because of this, even if the child operates the steering wheel at random, the child can run the car forward easily.

Moreover, The children's car of the present invention is provided with auxiliary wheels running at right angle or about right angle with the support axis of the shaft of the drive wheels. Because of this, the children's car is constructed in such a way as to run in a stable condition ensuring the saftey of the child. As a result, the child can ride the car around easily without worrying about its own safety and with simple operations of the steering wheel. Besides, as the steering block is in the form of a rectangular parallelepiped, the steering block can be manufactured easily, making it possible to install the pawl to the steering block easily. As a result, the productivity in manufacturing the children's car increased and the manufacturing cost is reduced.

DETAILED DESCRIPTION OF THE INVENTION

The children's car of the present invention is explained in detail as follows based on the drawings attached.

Figure 1:
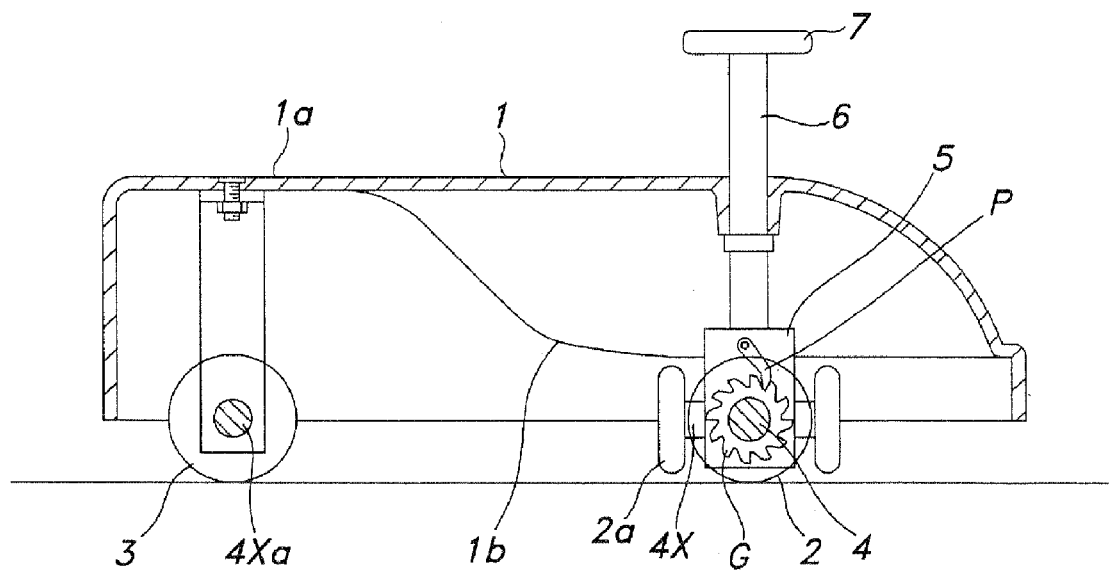
FIG. 1 is a cross-sectional view of the whole composition of the children's car of the present invention.
Figure 2:
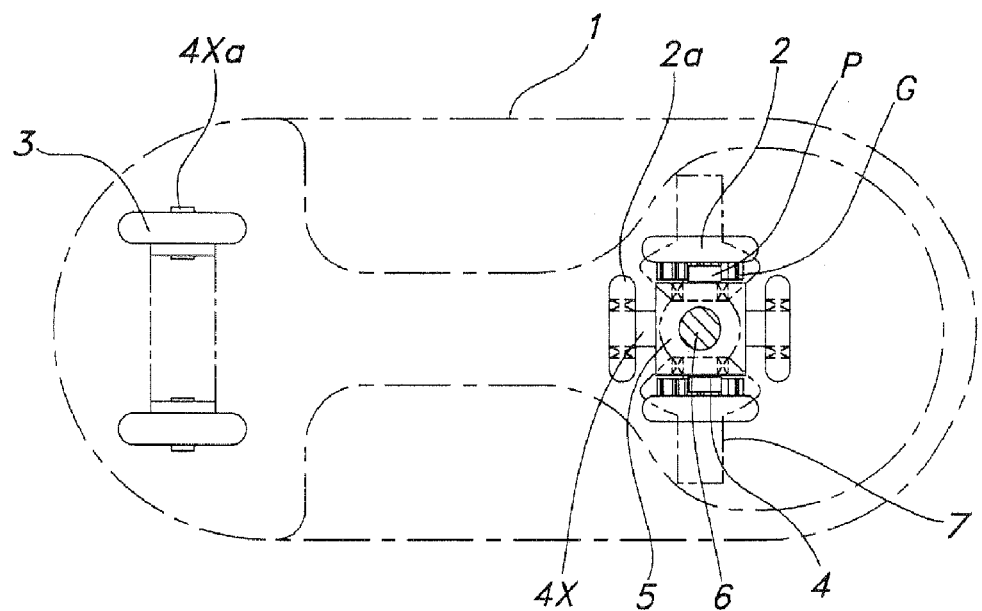
FIG. 2 is a bottom view of the children's car of the present invention.

FIG. 1 is a sectional view showing the whole structure of the children's car of the present invention. FIG. 2 is a bottom view showing the structure of the children's car of the present invention illustrating its drive system.

The main body of the children's car is the car body (1) having a seat (1a) and a footrest (1b). The body is usually made in an integral form of plastic material.

In the center front portion of the car body, a steering column (6) is provided vertically and rotatably. At the top of the steering column (6), a steering wheel (7) is fixed integrally. A steering block (5), a transmission member, is fixed to the steering steering column (6). Two shafts (4) are supported to the steering block (5) in a cantilever form with one end of each of the shafts (4) fixed to the steering block (5). A pair of ground-engaging drive wheels (2) are rotatably supported by the shafts (4). The pair of drive wheels (2), which are in touch with the floor or the ground, enable the car body (1) to run forward. The turning operation of the steering wheel (7) is transmitted to the drive wheels (2) through the steering block (5) and the shafts (4). For example, if the steering wheel (7) is turned right horizontally (clockwise in FIG. 2), the steering block (5) and the shaft (4) also turn horizontally in the same direction, and the turning of the shaft (4) is transmitted to the pair of drive wheels (2). At the rear of the car body (1) a pair of ground-engaging rear wheels (3) are provided rotatably through shafts (4Xa) in such a way that the rear wheels (3) touch the floor or the ground. Therefore, the car body (1) is supported by a pair of front wheels, namely, drive wheels (2) and a pair of rear wheels (3)

A pair of drive wheels (2) are supported rotatably to the shafts (4) provided on both sides of the steering block (5). A ratchet wheel (G) is integrally fixed to each of the drive wheels (2). Each of the drive wheels (2) can rotate independently together with a ratchet wheel (G). On each of the two walls (or sides) left and right of the steering block (5) a pawl (P) is provided in such as way as to engage with the ratchet wheel (G) fixed to the drive wheel (2). The steering block (5) has a form of a rectangular parallelepiped. The rectangular parallelepiped form is advantageous for the steering block (5) because it makes it easier to manufacture it, easier to attach pawls (P), increases productivity, and reduces production cost. Nevertheless, the steering block (5) may be made in a different form as long as it can be provided with the shafts (4), the pawls (P), and the shafts (4X) to be mentioned later.

The engagement of the pawl (P) with the ratchet wheel (G) leads the ratchet wheel (G) to rotate in one direction only, preventing an inverse rotation and serving a role of a one-direction clutch. Therefore, if one of the drive wheels (2) attempts to rotate forward, the ratchet wheel (G) also rotates in the same direction, without engagement between the ratchet wheel (G) and the pawl (P), leading one of the drive wheels (2) to rotate forward. However, if the drive wheel (2) attempts to rotate in the inverse direction backwards, the ratchet wheel (G) engages with the pawl (P) blocking the inverse rotation. Therefore, under such a circumstance, the drive wheel (2) cannot rotate backwards but remains still in the position in which it is located.

If the child turns the steering wheel (7) either right (clockwise as in FIG. 2) or left (counter-clockwise as in FIG. 2), one of the pair of drive wheels (2) rotates, stopping the other drive wheel (2) from moving or rotating. In other words, because one of the drive wheels (2) rotates forward in a circular arc motion with the point at which the other drive wheel is in contact with the floor or ground as an axial point, only one of the drive wheels (2) rotates forward, the other drive wheel standing still.

Figure 3:
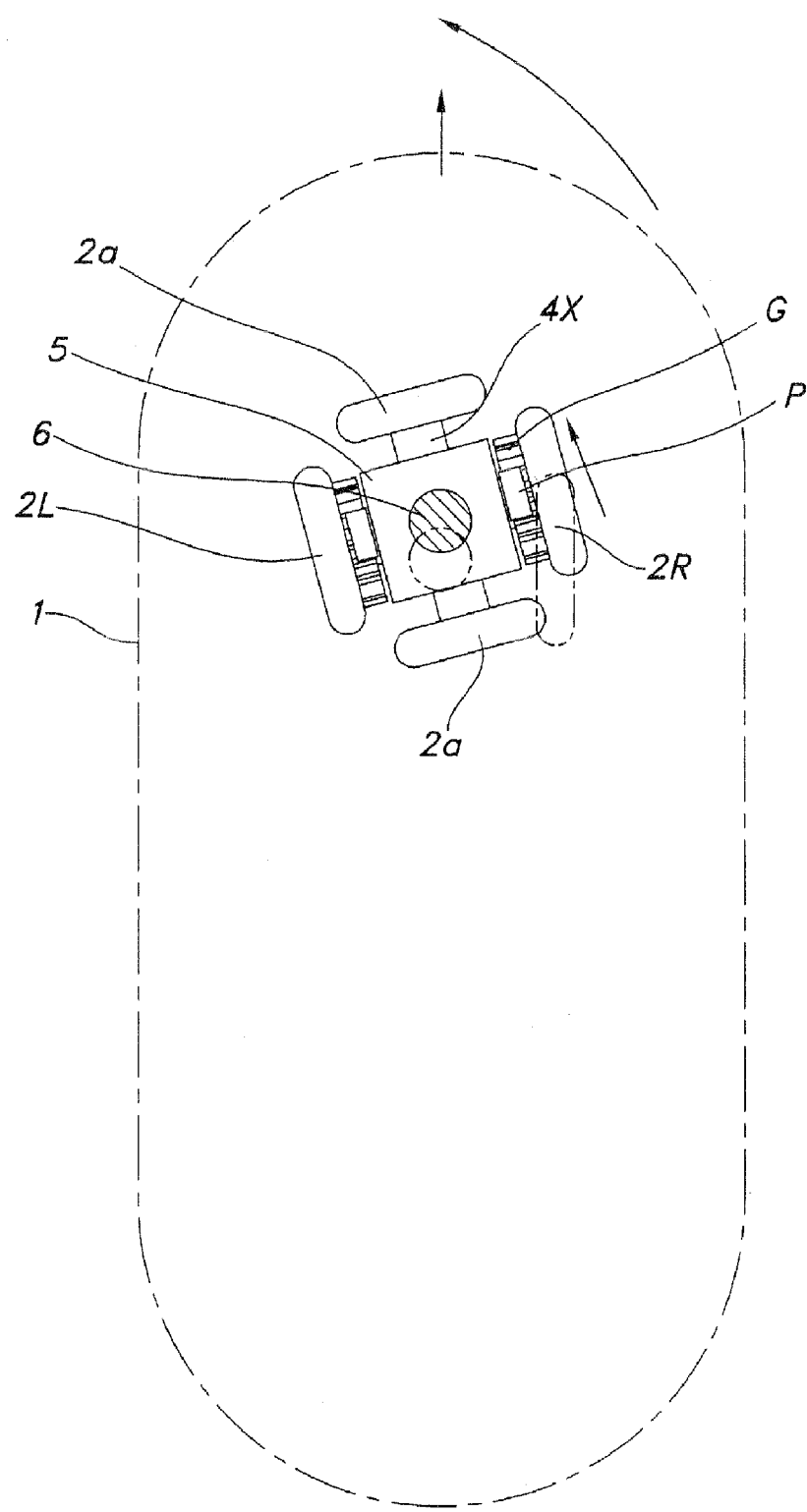
FIG. 3 illustrates the children's car being steered to the left.

Therefore, if the child turns the steering wheel (7) left and right alternately, the car body of the children's car moves forward in a zigzag pattern. For instance, as shown in FIG. 3, if the steering wheel (7) is turned left, the left drive wheel (2L) does not rotate because the ratchet wheel (G) and the pawl (P) are engaged. On the other hand, the right drive wheel (2R) rotates forward in a circular arc motion in the arrow direction according to the turn of the steering wheel (7) without the engagement of the ratchet wheel (G) with the pawl (P). The car body (1) moves forward to the extent that the axial line of the shaft (4) of the drive wheel (2) moved forward in a leftward circular arc motion, that is, to the extent that the right drive wheel (2R) rotated forward.

Figure 4:
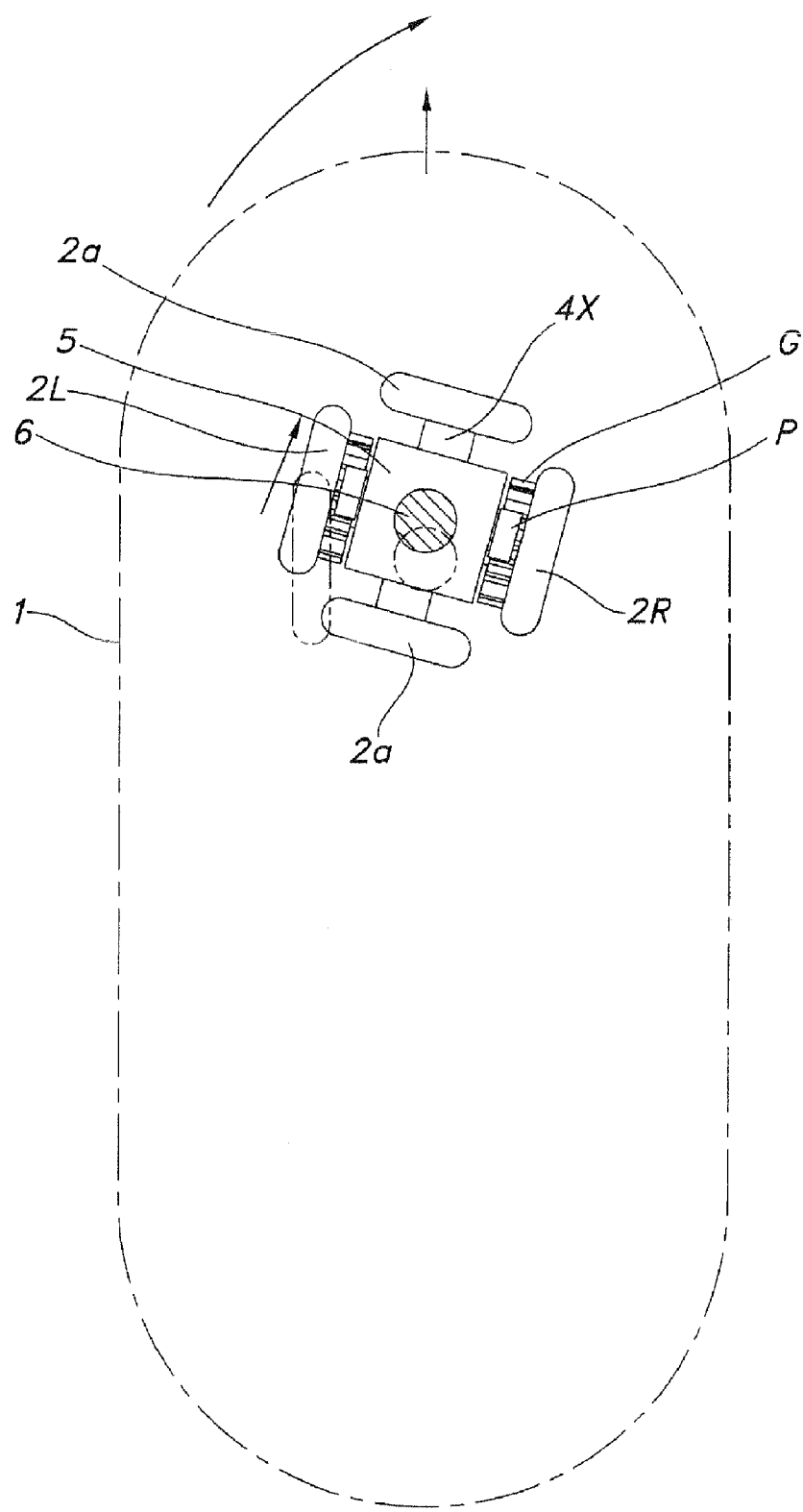
FIG. 4 illustrates the children's car being steered to the right.

FIG. 4 illustrates the circumstance where the steering wheel (7) is turned right. As described above, now conversely, the right drive wheel (2R) is locked and does not rotate, but the left drive wheel (2L) rotates according to the turn of the steering wheel (7), rotating forward in the arrow direction in a rightward circular arc motion without the engagement of the ratchet wheel (G) with the pawl (P). As a result, the car body (1) moves forward to the extent that the axial line of the shaft (4) of the drive wheel (2) moved forward in a rightward circular arc motion, that is, to the extent that the left drive wheel (2L) rotated forward. Accordingly, the car body (1) moves forward if the steering wheel (7) is turned alternately left and right. With the repetition of the alternate turning of the steering wheel (7), the children's car continues to move forward.

Figure 5:
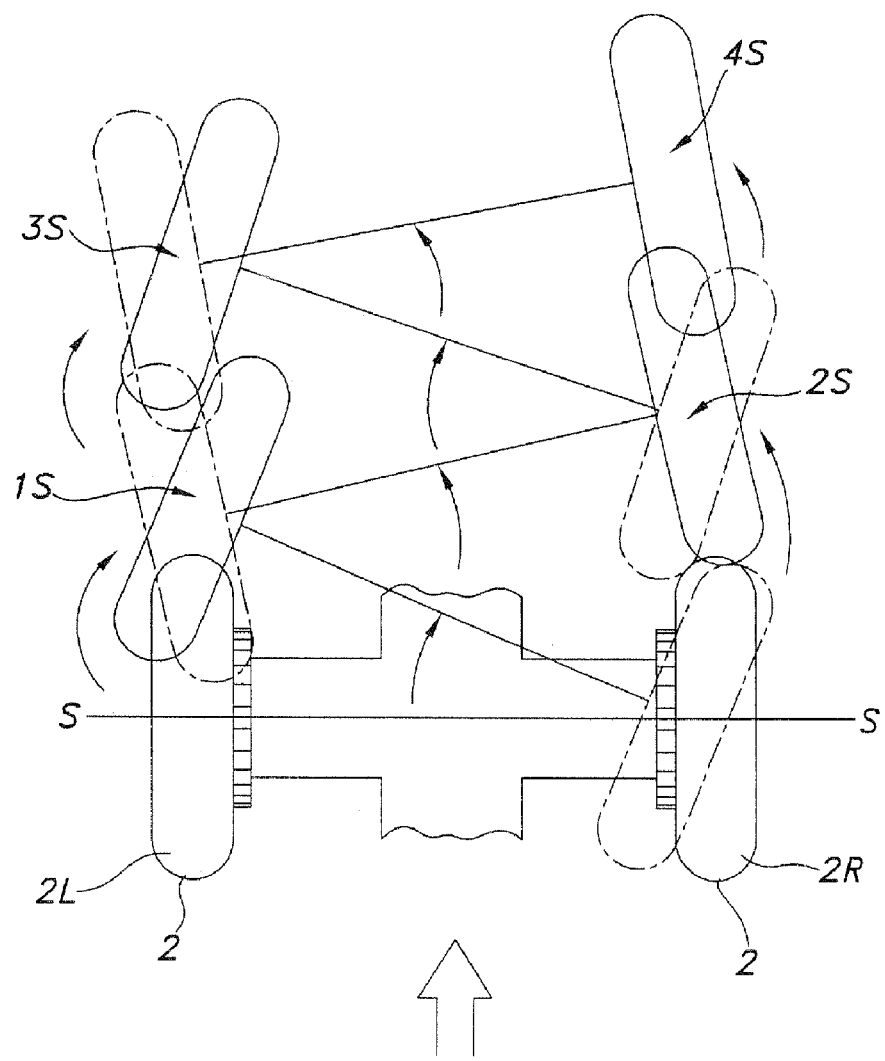
FIG. 5 illustrates a path of the drive wheels of the children's car driven in successive motions.

FIG. 5 illustrates said construction of the children's car of the present invention. Each of the pair of drive wheels (2) repeats the operation of rotating and stopping alternately, moving the car body (1) forward little by little in a zigzag pattern. With the S—S line in FIG. 5 as a start line, further description is given as follows. A right turn of the steering wheel (7) is transmitted to the pair of drive wheels (2) through the steering column (6) and the steering block (5). The right drive wheel (2R) receives a force to move backward, but is kept still, unable to rotate backward by the engagement of the ratchet wheel with the pawl (P). On the other hand, the left drive wheel (2L), free from the engagement of the ratchet wheel (G) with the pawl (P), rotates forward, as shown with an arrow, in a circular arc motion with the right drive wheel (2R) as an axial support point, moving forward to the position indicated as the first step (1S).

A left turn of the steering wheel (7) is transmitted to the pair of drive wheels (2) through the steering column (6) and the steering block (5). The left drive wheel (2L) receives a force to move backward, but is kept still, unable to rotate backward by the engagement of the ratchet wheel with the pawl (P). On the other hand, the right drive wheel (2R), free from the engagement of the ratchet wheel (G) with the pawl (P), rotates forward, as shown with an arrow, in a circular arc motion with the left drive wheel (2L) as an axial support point, moving forward to the position indicated as the second step (2S).

If the right and left turns of the steering wheel (7) are made continuously, the car body (1) moves forward to the positions shown as the third step (3S) and the fourth step (4S), and so on, moving forward in a zigzag pattern. Thus, the child, sitting on the seat of the children's car, can move the car forward with a simple operation of the steering wheel (7).

Now further explanation is given to the construction on the safety and stable operation of the children's car of the present invention in running the car. Both at the front and rear of the steering block (5), a shaft (4X) is provided with one end of it supported to the steering block (5) in a cantilever form. Each of the shafts (4X) is provided with an auxiliary wheel (2a) for the stability of the car body (1). In other words, the shafts, (4X) whose axial lines cross the axial lines of the shafts (4) at right or about right angle, are provided with rotatable auxiliary wheels (2a). The auxiliary wheels (2a) are not drive wheels but are designed to maintain the car body (1) in a stable condition. The child, riding the children's car, could move his body forward or stand up suddenly, causing the car body (1) to tilt and lose balance. Under such circumstances, the auxiliary wheels (2a), in touch with the floor or the ground, support the car body (1). The auxiliary wheels (2a), under normal condition, are designed to have a slight gap between them and the floor or the ground on which the car runs. In other words, under normal condition, there is a certain distance between the auxiliary wheels (2a) and the surface on which the car runs. The normal condition here means the condition where a pair of drive wheels (2) and a pair of rear wheels (3) are in touch with the floor or the ground with the children's car supported stably. If the steering wheel (7) is turned and change the direction of the drive wheels (2) through the steering block (5), the direction of the auxiliary wheels (2a) also changes accordingly. Under such circumstance as well, if the car body (1) is likely to lose balance, the auxiliary wheels (2a) support the car body (1) maintaining its balance.

In particular, the front auxiliary wheel (2a) serves to prevent the car body (1) from falling forward. With a certain distance between the auxiliary wheels (2a) and the running surface, the auxiliary wheels (2a) do not cause hindrance to the children's car running, even if the running surface is somewhat rough with some convex and concave. Furthermore, for instance, if the child turns the steering wheel (7) left or right nearly 90 degrees, conventional children's cars would become very unstable like a children's tricycle. However, the children's car of the present invention, with the auxiliary wheels (2a) provided near the sides of the car body (1), support the car body (1) under such circumstances when the car body tilts, by touching the ground and supporting the car body (1). In other words, even if the steering wheel is turned very hard, the drive wheels (2) and the auxiliary wheels (2a) keep the front part of the car body (1) stable.

The child may often operate the steering wheel (7) of the children's car roughly. While operating the steering wheel (7), the child may make sudden, irregular movements. Under such circumstances, the auxiliary wheels (2a) can cope with such an unexpected situation and help keep the children's car stable.

Explanation is given as above on various embodiments, however, the present invention is not limited to the embodiments given above. In other words, various other embodiments and examples may be implemented within the scope of the objectives and tenor of the present invention.

What is claimed is:

1. A children's car, comprising:
   a body;
   a pair of ground-engaging drive wheels provided at a bottom of the body, each drive wheel having a ratchet operably connected thereto;
   a rotatable steering bar rotatably supporting the ground-engaging drive wheels and ratchets;
   a pair of pawls supported by the steering bar and adapted for engaging the ratchets, whereby rotation of the ground-engaging drive wheels and ratchets is limited to a forward direction; and
   at least one auxiliary wheel rotatably supported by the steering bar.

2. The car of claim 1, further comprising at least one ground-engaging rear wheel provided at the bottom of the body.

3. The car of claim 1, further including a steering mechanism for rotating the steering bar.

4. The car of claim 1, wherein the at least one auxiliary wheel is held at a spaced distance from the ground.

5. The car of claim 1, wherein the pair of ground-engaging drive wheels define a first longitudinal axis across the steering bar and the at least one auxiliary wheel is supported along a second longitudinal axis defined across the steering bar, the first and second longitudinal axes defining an included angle of about 90 degrees.

6. The car of claim 5, further including a pair of auxiliary wheels supported on opposed sides of the steering bar along the second longitudinal axis.

7. The car of claim 1, wherein the steering bar is a block substantially defining a parallelepiped.

8. A children's car, comprising:
   a body;
   a steering bar positioned at a bottom of the body, the steering bar defining at least a left side, a right side, a front side, and a rear side;
   a first ground-engaging drive wheel having a first ratchet operably connected thereto rotatably supported from the steering bar left side;
   a second ground-engaging drive wheel having a second ratchet operably connected thereto rotatably supported from the steering bar right side;
   first and second pawls supported by the steering bar and adapted for respectively engaging the first and second ratchets;
   a steering mechanism for turning the steering bar;
   a first auxiliary wheel rotatably supported from the steering bar front side; and
   a second auxiliary wheel rotatably supported from the steering bar rear side.

9. The car of claim 8, wherein the steering bar is a block substantially defining a parallelepiped.

10. The car of claim 8, wherein the first and second ground-engaging drive wheels define a first longitudinal axis across the steering bar and the first and second auxiliary wheels define a second longitudinal axis across the steering bar, the first and second longitudinal axes defining an included angle of about 90 degrees.

11. The car of claim 8, further including a steering mechanism for rotating the steering bar.

12. The car of claim 11, wherein the steering mechanism comprises a steering column extending upwardly from the steering bar and adapted for rotating by a user.

* * * * *